Fig. 1.

No. 716,821. Patented Dec. 23, 1902.
J. A. E. CRISWELL.
MACHINE FOR MAKING MATCHES.
(Application filed May 14, 1901.)
(No Model.) 3 Sheets—Sheet 2.

WITNESSES: INVENTOR

No. 716,821. Patented Dec. 23, 1902.
J. A. E. CRISWELL.
MACHINE FOR MAKING MATCHES.
(Application filed May 14, 1901.)
(No Model.) 3 Sheets—Sheet 3.

WITNESSES:

INVENTOR

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,821, dated December 23, 1902.

Application filed May 14, 1901. Serial No. 60,212. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to machines such as disclosed in my Patent No. 656,014, dated August 14, 1900.

The primary object of the invention is to provide simple and efficient means by which the splints may be cut from strips, blanks, or cards of veneer and then by movable means separated and finally discharged directly into holding means in position for treatment to complete the matches.

A further object of the invention is to provide simple and efficient means by which previously-cut splints are moved bodily at once and separated into a series of more than two independent parallel rows.

With these and other objects in view the invention consists in the construction and combination of the several parts, substantially as hereinafter described and then pointed out in the claims at the end of the description.

The frame 10 may be of any suitable form or construction, and projecting outward from the upper portion thereof is a hopper 11, in which are placed the cards or blanks of veneer 12. These cards or blanks are of the length and thickness of the splints and of a width sufficient to provide a number thereof, and said blanks or cards are forced inward through the hopper by a follower 13. The cards as they are forced inward rest against the face of an abutment-plate 14 and under the plunger 15. This plunger 15 is secured to slides 16, that are adapted to move vertically in the guides 17. The slides 16 are connected to the levers 18, and these levers are secured at one end to the shaft 19. An arm 20 is loosely mounted on the shaft 19 and has a yielding connection with the levers 18, and projecting outward from the arm 20 is a shorter arm 21. The arm 21 is connected to a strap 22, that is operated by an eccentric on the shaft 23, and as said shaft is rotated the arms 20 and the levers 18 will force the plunger downward and at each reciprocation thereof will force a card or blank of veneer to the cutting device 24. The cutting device 24 may be of the usual or any preferred form. As shown, it consists of a series of circular cutters 25, spaced apart the width of the splints and held to a shaft or spindle 26, and said cutters cut the cards into splints against a preferably metallic roll 27. The splints as they are cut will be forced downward between the guides 28 and 29, the plunger being slotted to assist in forcing the splints downward and to finally aline the splints. The invention thus far described is substantially identical with that disclosed in my patent hereinbefore referred to, and any or all of the parts may be of the usual or of any preferred construction.

Figure 1:
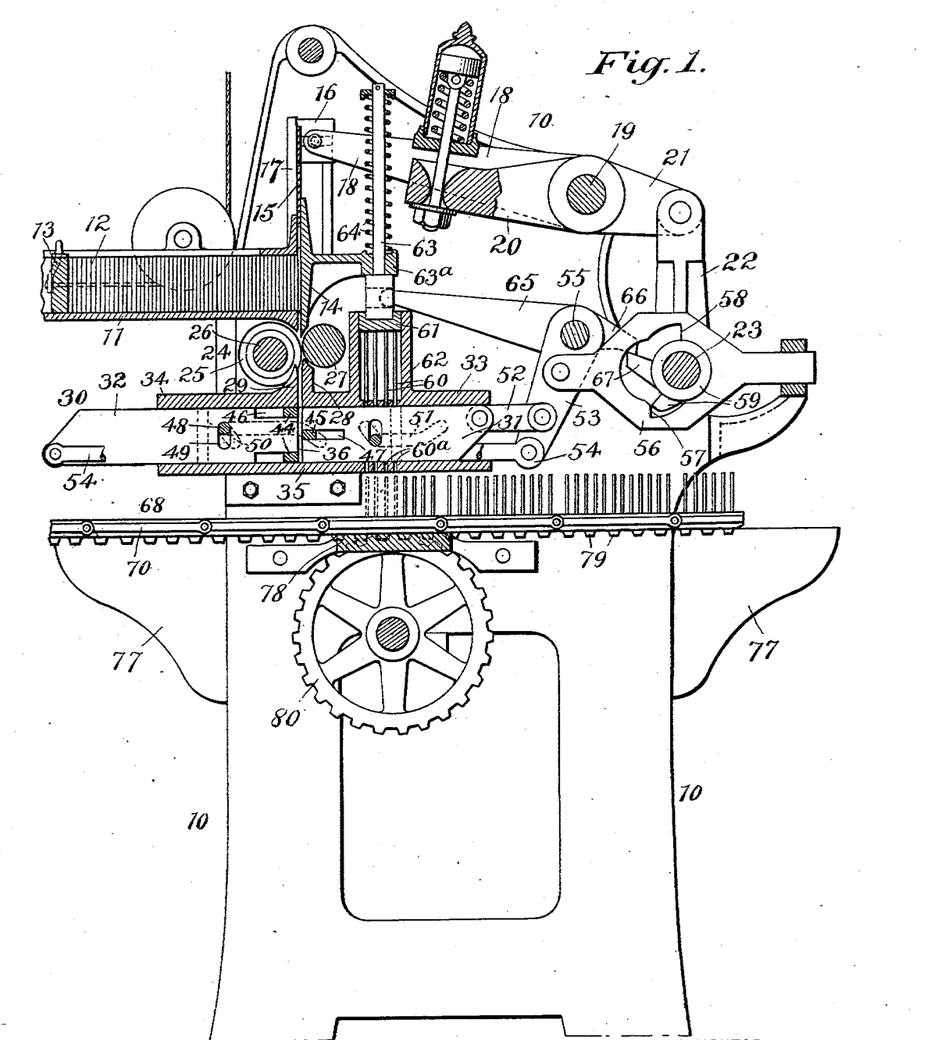
Figure 1 is a vertical longitudinal section of one form of machine embodying my invention.
Figure 2:
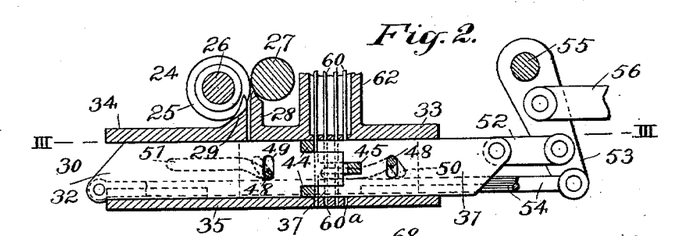
Fig. 2 is a fragmentary detail section of the separator and the cutting device, the parts being in position to separate the splints into independent rows.
Figures 3, 7, 8:
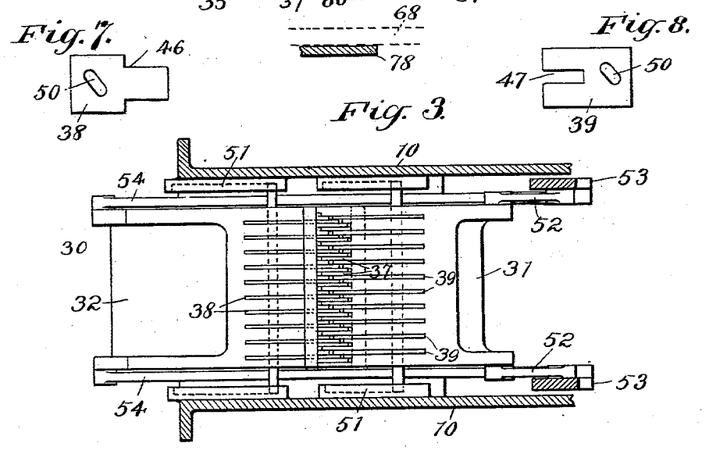
Fig. 3 is a fragmentary sectional plan view taken on the line III III of Fig. 2, the parts being in position to separate the splints.
Figs. 7 and 8 are detail elevations of the sliding plates or splint-engaging devices of the separator members.
Figure 4:
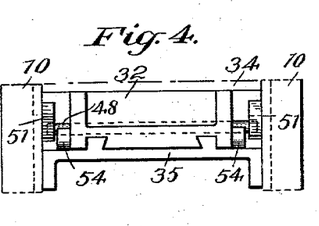
Fig. 4 is a fragmentary end elevation of the separator, showing how the latter is slidingly held on the frame.
Figure 5:
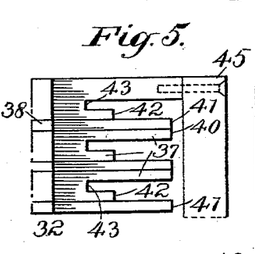
Fig. 5 is a fragmentary detail plan view of one of the members or sections of the separator.
Figure 6:
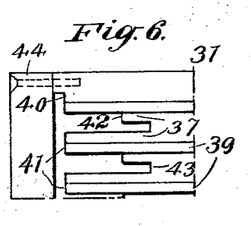
Fig. 6 is a fragmentary detail plan view of the other section or member of the separator.
Figure 9:
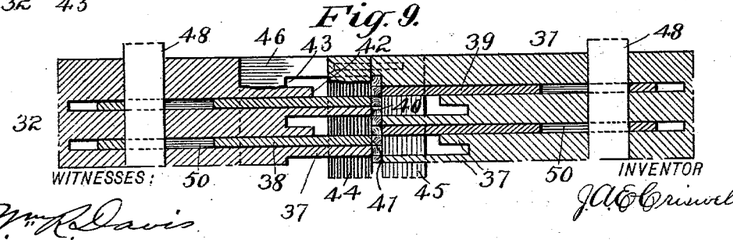
Fig. 9 is a fragmentary sectional plan view through the separator.
Figure 10:
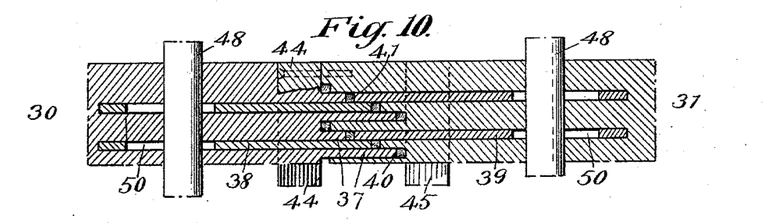
Fig. 10 is a view similar to Fig. 9, except that the parts are in a different position.
Figure 11:
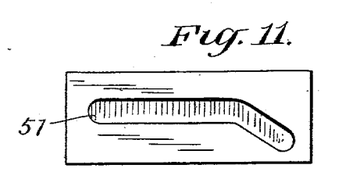
Figs. 11 and 12 are fragmentary views showing the cam-grooves that actuate the rods for moving the independent sliding plates or splint-engaging devices of the separator.
Figure 12:
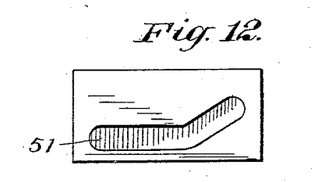

For the purpose of dividing or separating the splints various means or devices may be employed. As shown, the separator 30 consists of two members or sections 31 and 32, which are adapted to have a reciprocatory bodily movement between the bearing-plates 33, 34, and 35, and said members are adapted to form between them splint receiving and holding devices 36. Each member or section of the separator is provided with fixed fingers 37, and the member 32 is provided with independently-movable or sliding plates 38, while the member 31 is provided with independent sliding plates or splint-engaging devices 39. The ends of the fingers 37 and the sliding plates form abutments 40, 41, 42, and 43 for the splints, and the members or sections 31 and 32 are provided with backing plates or bars 44 and 45, respectively. The bars or backing-plates 44 of the member or section 31 is movable in slots 46 in the member 32, and the bar or backing-plate 45 of the member 32 of the separator is adapted to move in a slot 47 in the member 31 when the splints are to be divided into independent rows, as will be presently described. The splints will be forced into the separator in a single row and in a common plane between the members and the bars 44 and 45 of the separator. The splint engaging and holding devices are arranged in four sets, and one set, or every fourth splint, is held between the abutments 40 of the longest fingers 37 and the bar 45 of the member 32. The next set of splints will be similarly held between the bars 44 and the longest fingers 37 of the member 31. A third set, or every fourth splint, will be held between abutments 41 of the sliding plates 38 of the member 32 and the backing-bar 45 of said member, and the fourth set of splints will be held between the sliding plates 39 and the backing-bar 44 of the member or section 31. The splints are thus positively held on opposite faces thereof and are always under complete control. A rod or bar 48 passes through the vertical slots 49 of each member or section of the separator and through cam-slots 50 of the sliding plates or fingers 38 and 39. The ends of these rods ride in cam-grooves 51, Figs. 3, 10, and 11, of the frame 10 and at the proper time are forced vertically in the separator members, so as to operate the sliding plates or fingers 38 and 39 in opposite directions the proper distances apart to permit separation of the splints. The member 31 of the separator is connected by links 52 to rock-levers 53, and connected to the lower end of said levers are the rods 54, which are pivoted at their opposite ends to the member or section 32 of the separator. It will be seen that as the levers 53 are operated the links 52 and rods 54 will force the separator-sections bodily inward and will carry the splints bodily therewith, and owing to the different distances of the rods 54 and links 52 from the pivot of the levers 53 the throw of said members or sections of the separator will vary and will be forced toward each other while both are moved bodily. This will cause the set of splints held between the backing-bar 45 and the longest fingers 37 of the member 32 to be carried farthest inward, while the set of splints held between the longest fingers 37 and the backing bars or plates 44 of the member 34 will be forced outward. As the sets of splints which are held between the backing-bars and the sliding plates 38 and 39 reach the abutments 42 of the members 31 and 32 the rods 48 and 49, working in the slots 50 of the sliding plates 38 and 39, will gradually force said plates apart a sufficient distance to provide abutments for the sets of splints and to retain the latter between said abutments, as shown most clearly in Figs. 2, 3, and 10. The fingers are thus made to fit between each other and to intermesh while separating the splints, and the latter are always under complete control.

The levers 53 are secured to a rock-shaft 55, and to said levers are pivoted one end of cam-heads 56, the other end of said heads being slidingly held in the frame 10. The cam-heads 56 are each provided with cam-engaging portions 57 and 58, adapted to be engaged at the proper time by cams 59 on the shaft 23, so that as said cams are rotated the cam-heads 56 will be moved so as to oscillate or rock the levers 53 and through the latter impart a reciprocatory movement to the separator to divide the splints, as already described, and to carry the splints beneath the plungers 60 and over the openings 60$^a$ in the bearing-plate 35. The plungers 60 are arranged in rows to correspond with that of the separated splints, and said plungers are secured to a vertically-movable head 61, that is properly guided in the uprights or guides 62, that are formed on or secured to the bearing-plate 33. The plunger-head 61 has rods 63 projecting upwardly therefrom. These rods are suitably guided in brackets 63$^a$, formed as a part of the backing-plate 14, and around the rods 63 are springs 64, that normally force the head and plungers upward. The head 61 has slots in which the ends of levers 65 are adapted to work. The levers 65 are loosely held on the shaft 55 and are provided with extensions 66, that are engaged by cams 67, secured to and rotating with the shaft 23. As the shaft 23 is rotated the cams 67 will engage the extensions 66 and through the levers 65 force the plunger-head 61 and the plungers 60 downward, so as to force the independent rows of separated splints from the separator through the openings 60$^a$ into the carrier 68, the springs 64 serving to return the plungers from the separator immediately the cams 67 cease to act on the extensions 66 of the levers 65.

Any suitable form of carrier may be employed for holding the splints to complete the matches. As shown, there is a series of sections linked together, and each section comprises a frame 70, to which are held a number of rows of splint-holding devices. Each row of holding devices comprises two opposed metallic plates 71, which are held by lugs 72 on the frame 70, and each plate is bent at intervals, as at 73, to form with its opposed member or plate individual sockets for the splints. The bent portions 73 are each cut so as to form spring-fingers 74, between which the splints are rigidly held when forced into the sockets by the plungers 60. The frame 70 is supported in pockets 75, formed in an endless linked carrier 76, so as to be readily removable therefrom, the members of the carrier being joined together and supported during its movement through the machine by the brackets 77 on the frame and the bar 78, which latter also forms an abutment for the splints when forced into the carrier. The frames 70 may be introduced into or removed from the pockets of the carrier in any suitable manner, and the endless linked carrier may be of sufficient length to permit dipping and heading of the matches, the frames being then removed to permit the heads to set and dry. The carrier-sections are provided with teeth 79, which are engaged by the usual driving-wheels 80, between which is the plate or bar 78, that is adapted to take the thrust while the splints are being forced from the separator into the carrier. The shaft of the gears 80 may be operated from the drive-shaft 23 in substantially the same manner as in my patent already referred to, and any suitable timing mechanism may be employed for operating the several parts and to connect the shaft 23 operatively with the cutter-spindle 25 to rotate the latter.

The invention will be readily understood from the foregoing description when taken in connection with the accompanying drawings.

The parts being in the position shown and the drive-shaft 23 operated, the plunger 15 will be forced downward, so as to drive one of the cards 12 to the cutting device 24. The card will be cut into splints by the cutting device and forced between the guides 28 and 29, and those previously cut will be forced into the receiving devices 36 of the separator 30. The separator will now be thrown to the position shown in Figs. 2 and 3 by the mechanism previously described. One set, or every fourth splint, will be carried by the longest fingers 37 and bar 45 of the member 32, so as to rest against the abutments 43 of the member 31. A second set will be carried by the sliding plates 38 and bar 45 to and against the abutments 42 of the member 31. A third set will be forced by the longest fingers 37 and bar 44 of the member 31 of the separator to and against the abutments 42 of the member 32, thus dividing the splints into four independent and parallel rows, the plates being forced apart by the rods 48, as already described. At this time the plungers 60 will be forced downward, so as to force the splints from the separator into the carrier 68, the matches being then completed in the usual or in any preferred manner.

Figures 13, 14, 15, 16, 17:
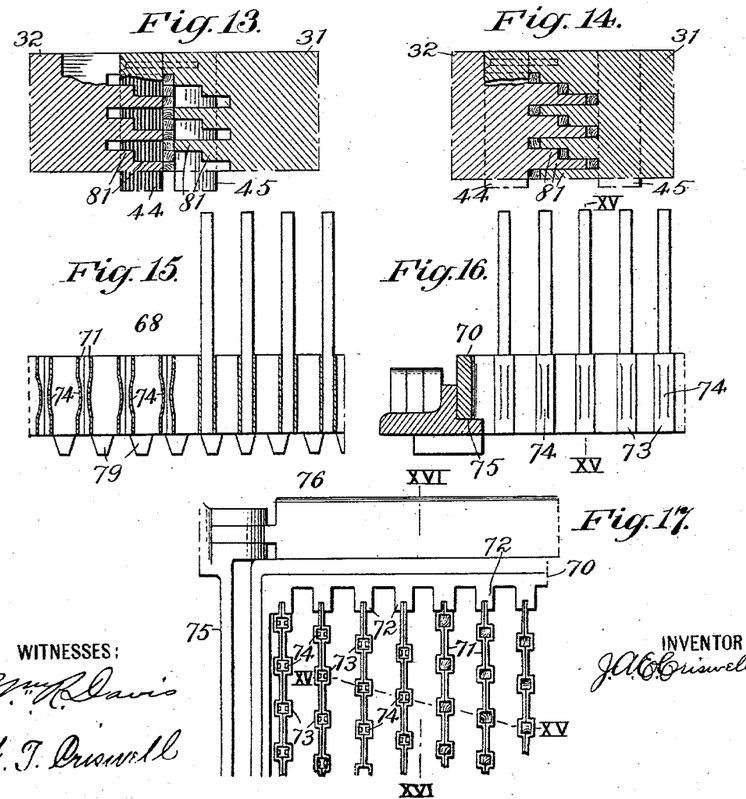
Fig. 13 is a fragmentary detail plan of the separator of the form shown in the other views, except that the independent sliding plates are dispensed with and the splints are divided into three instead of four independent rows.
Fig. 14 is a view similar to Fig. 13, except that the parts are in a position to separate the splints into independent rows.
Fig. 15 is an enlarged fragmentary section of one form of carrier, taken on the line XV XV of Figs. 16 and 17.
Fig. 16 is a vertical transverse section taken on the line XVI XVI of Fig. 17.
Fig. 17 is a fragmentary plan view of the carrier.

Instead of the splints being separated into four independent rows, as already described, the number of rows may vary, as desired. As shown in Figs. 13 and 14, the splints are divided into three independent parallel rows. The separator members are constructed and operated in substantially the same manner as already described, except that the sliding plates or fingers 38 and 39 for engaging and holding the splints are dispensed with. The fingers 81 of the separable members 31 and 32 are all fixed, and the longest fingers 81 of each member are adapted to hold one set of splints between them and the backing-bar carried thereby. The fingers and bars in this case provide a common entering groove or channel, as in the other form of separator; but instead of each set of splints being positively held the intermediate set, or every third splint of the row, is free to move in the direction of movement of the separator after the two sets positively held are separated therefrom. This set of splints cannot move in any direction except that toward its abutments or holding-sockets and for that reason cannot get out of place and at the extreme end of the throw of the separator members will be properly held to be forced into the carrier by the plungers 60.

From the foregoing it will be seen that simple and efficient means are provided whereby the splints may be moved bodily and properly separated and then positively forced into a suitable carrier.

In my pending application, Serial No. 737,186, filed November 16, 1899, movable means for carrying splints away from the cutting means and separating the splints into independent rows by fixed fingers or otherwise and forcing such rows into the holding-carrier or dipping-frames and in my divisional application, Serial No. 52,005, filed March 20, 1901, a bodily-movable separator having members or receivers that properly separate the splints and the latter held by suitable dipping means is claimed broadly, and hence such means is not broadly claimed herein.

The form of the splints may vary, and by the word "veneer" is included any material from which splints may be made.

It will be understood that instead of feeding cards the length of the splints to the cutting device long blanks may be fed thereto and then the long splint strips cut transversely by a second cutting device to form complete splints, these being cut, if desired, while held between the separator members, and instead of the backing-bars of the separator being fixed they might be yieldingly held to the members. It will be also understood that a blower or exhaust means may be employed to remove any waste or dust that might collect in cutting the splints and that suitable locking and alining means might be employed to positively hold the carrier while receiving the splints from the separator.

Having thus described my invention, what I claim as new, and desire to secure by Letters Patent, is—

1. In a match-making machine, the combination with means for supplying splints, of a separator having bodily-movable separable members receiving the splints in a common plane and provided with fixed fingers which separate the splints into a series of more than two independent rows, and holding means for the splints.

2. In a match-making machine, the combination with splint-cutting means, of a separator comprising separable bodily-movable members receiving the splints in a common plane and provided with fixed fingers which separate the splints into a series of more than two independent and parallel rows, a carrier, together with plungers for forcing the splints from the separator into the carrier.

3. In a match-making machine, the combination with splint-cutting means, of a bodily-movable separator comprising two members each provided with fingers which fit into the other member and separate the splints into independent rows, and holding means for the splints.

4. In a match-making machine, the combination with splint-cutting means, of a bodily-movable separator comprising two members each provided with fingers which fit into the other member and separate the splints into more than two independent rows, a carrier, and plungers for forcing the splints from the separator into the carrier.

5. In a match-making machine, the combination with means for supplying splints, of a separator comprising two bodily-movable members each provided with fingers which fit into the other member and separate the splints into independent rows, holding means for the splints, and a plunger device for forcing the splints from the separator into the holding means.

6. In a match-making machine, the combination with a splint-cutting device, of a separator comprising bodily-movable members, transverse bars fixed to the members and forming backings for the splints received from the cutting device, and holding means for the splints.

7. In match-making machinery, the combination with splint-cutting means, of a separator comprising two bodily-movable members, transverse bars fixed to the members and forming backings for the splints received from the cutting device, holding means for the splints, and plungers for forcing the splints from the separator into the holding means.

8. In a match-making machine, the combination with a splint-cutting device, of a bodily-movable separator comprising separable members, transverse bars fixed to the members and forming backings for the splints received from the cutting device, means for operating the members so as to separate the splints into a series of independent parallel rows, and holding means for the splints.

9. In a match-making machine, the combination with a splint-cutting device, of a bodily-movable separator comprising two separable members, transverse bars fixed to the members and engaging opposite faces of the splints, holding means for the splints, and means for forcing the splints from the separator into the holding means.

10. In a match-making machine, the combination with means for supplying splints, of a bodily-movable separator comprising separable members which separate the splints into independent rows, independently-movable splint-engaging devices carried by each of the members of the separator, and holding means for the splints.

11. In a match-making machine, the combination with means for supplying splints, of a bodily-movable separator comprising separable members which separate the splints into independent rows, independently-movable splint-engaging devices carried by each of the members of the separator, holding means for the splints, together with plungers for forcing the splints from the separator into the holding means.

12. In match-making machinery, the combination with means for supplying splints, of a bodily-movable separator comprising separable members which separate the splints into more than two independent rows, independently-movable splint-engaging devices carried by each of the members of the separator, and holding means for the splints.

13. In a match-making machine, the combination with means for supplying splints, of a bodily-movable separator comprising separable members receiving the splints endwise and which separate the splints into more than two independent rows, independently-movable splint-engaging devices carried by each of the members of the separator, holding means for the splints, together with plungers for forcing the splints from the separator into the holding means.

14. In a match-making machine, the combination with splint-cutting means, of a separator comprising two bodily-movable separable members for separating the splints into independent rows, sliding plates movable with and independent of the members of the separator for retaining and holding certain of the splints, and holding means for the splints.

15. In match-making machinery, the combination with splint-cutting means, of a separator comprising two bodily-movable members which receive the splints endwise in a single row and which separate the row into independent rows, sliding plates movable with and independent of the movable members of the separator for retaining and holding certain of the splints, a carrier, together with plungers for forcing the splints from the separator into the carrier.

16. In a match-making machine, the combination with splint-cutting means, of a bodily-movable separator comprising two separable members receiving the splints endwise in a single row and moving them bodily at once and separating the row into more than two independent parallel rows, sliding plates movable with and independent of the members of the separator for retaining and holding certain of the splints, and holding means for the splints.

17. In a match-making machine, the combination with splint-cutting means, of a bodily-movable separator comprising separable members having fixed fingers adapted to fit into each other and separate the splints, transverse bars carried by each member of the separator and engaging opposite faces of the splints, splint-engaging devices independently movable of and working in the members of the separator, and holding means for the splints.

18. In a match-making machine, the combination with means for supplying splints, of a bodily-movable separator comprising separable members having fingers forming sockets for the splints, the fingers of one member fitting between the fingers of the other member and separating the splints into independent rows, transverse bars carried by and forming a part of the separator members and engaging opposite faces of the splints, splint-engaging devices independently movable of and working in the members of the separator and adapted to retain and hold certain of the splints and to assist in their proper separation, and holding means for the splints.

19. In a match-making machine, the combination with splint-cutting means, of a bodily-movable separator comprising separable members having fixed fingers receiving the splints in a single row between them and carrying such row bodily at once to the side of the cutting means and dividing the row into more than two independent rows, transverse bars carried by each member of the separator and engaging opposite faces of the splints, splint-engaging devices independently movable of and working in the members of the separator, and holding means for the splints.

20. In a match-making machine, the combination with splint-cutting means, of a bodily-movable separator comprising separable members, transverse bars carried by the members of the separator and engaging opposite faces of the splints, splint-engaging devices independently movable of and working in the members of the separator, holding means for the splints, and plungers for forcing the splints from the separator into the holding means.

21. In a match-making machine, the combination with means for supplying splints, of a bodily-movable separator comprising separable members having fixed fingers which separate the splints into independent rows, transverse bars carried by and forming a part of the separator members and engaging opposite faces of the splints, splint-engaging devices independently movable of and working in the members of the separator and adapted to retain and hold certain of the splints and to assist in their proper separation, holding means for the splints, together with plungers for forcing the splints from the separator into the holding means.

22. In a match-making machine, the combination with splint-cutting means, of a bodily-movable separator comprising separable members which separate the splints into independent rows, a series of sliding plates arranged in each member of the separator and independently movable therein, rods passing through the separator members and operatively connected with the sliding plates, means for operating the rods, transverse bars or rods carried by the separator members and adapted to engage opposite faces of the splints, and holding means for the splints.

23. In a match-making machine, the combination with splint-cutting means, of a bodily-movable separator comprising separable members having fixed fingers which receive the splints endwise in a single row between them and which separates the row of splints into more than two independent rows, a series of sliding plates arranged in each member of the separator and independently movable therein, rods passing through the separator members and operatively connected with the sliding plates, transverse bars or rods carried by the separator members and adapted to engage opposite faces of the splints, and holding means for the splints.

24. In a match-making machine, the combination with splint-cutting means, of a bodily-movable separator comprising separable members having fixed fingers adapted to intermesh which separate the splints into more than two independent rows, a series of sliding plates arranged in each member of the separator and independently movable therein, rods passing through the separator members and operatively connected with the sliding plates, transverse bars or rods carried by the separator members and adapted to engage opposite faces of the splints, holding means for the splints, together with plungers for forcing the splints from the separator into the holding means.

25. In a match-making machine, the combination with splint-cutting means, of a bodily-movable separator comprising two separable members each having independent sliding plates and which separates the splints into independent rows, and holding means for the splints.

26. In a match-making machine, the combination with means for supplying splints, of a bodily-movable separator comprising two separable members provided with fixed fingers adapted to intermesh and each having independent sliding plates and adapted to separate the splints into more than two independent rows, and holding means for the splints.

27. In a match-making machine, the combination with means for supplying splints, of a bodily-movable separator comprising two separable members each having fixed fingers and independent sliding plates and adapted to separate the splints into more than two independent rows, holding means for the splints, and plungers for forcing the splints from the separator into the holding means.

28. In a match-making machine, the combination with splint-cutting means, of a separator receiving the splints endwise in a single row comprising two bodily-movable members each having fingers forming sockets for the splints and which moves the row bodily at once, the fingers of one member fitting between the fingers of the other member and separating the splints into more than two independent rows, and holding means for the splints.

29. In a match-making machine, the combination with splint-cutting means, of a separator receiving the splints endwise in a single row and comprising two bodily-movable members each having fingers forming sockets for the splints and which moves the row bodily at once, the fingers of one member fitting between the fingers of the other member and separating the splints into independent rows, holding means for the splints, together with plungers for forcing the splints from the separator into the holding means.

30. In a match-making machine, the combination with splint-cutting means, of a bodily-movable separator comprising two separable members movable toward and from each other each having fingers forming sockets for the splints, the fingers of one member fitting between the fingers of the other member to separate the splints into a series of independent rows, holding means for the splints, and a plunger device working between the fingers of the separator and forcing the splints into the holding means.

31. In a match-making machine, the combination with splint-cutting means, of a bodily-movable separator comprising two separable members receiving the splints endwise from the cutting means and having fixed fingers adapted to intermesh and which divide the splints into independent rows, levers, connections between the levers and the separator members for moving them bodily and forcing them toward and from each other during such bodily movement, means for operating the levers and connections to cause the separator to divide the splints, and holding means for the splints.

32. In a match-making machine, the combination with splint-cutting means, of a bodily-movable separator comprising two separable members having fixed fingers receiving the splints endwise between them from the cutting means in a single row and which moves such row bodily at once and divides it into independent rows, levers, connections between the levers and the separator members for moving them bodily and forcing them toward and from each other during such bodily movement, means for operating the levers and connections to cause the separator to divide the splints, holding means for the splints, together with plungers for forcing the splints from the separator into the holding means.

33. In a match-making machine, the combination with splint-cutting means, of a bodily-movable separator comprising two separable members having fixed fingers receiving the splints endwise between them from the cutting means in a single row and which moves such row bodily at once to the side of the cutting means and which divides the row into more than two independent rows, levers, connections between the levers and the separator members for moving them bodily and forcing them toward and from each other during such bodily movement, means for operating the levers and connections to cause the separator to divide the splints, and holding means for the splints.

34. In a match-making machine, the combination with means for supplying splints, of a bodily-reciprocatory separator having separable members receiving the splints in a common plane and provided with fixed fingers which separate the splints into a series of more than two independent rows, and holding means for the splints.

35. In a match-making machine, the combination with splint-cutting means, of a bodily-reciprocatory separator having separable members receiving the splints in a common plane and provided with fixed fingers which separate the splints into a series of more than two independent and parallel rows, a carrier, together with plungers for forcing the splints from the separator into the carrier.

36. In a match-making machine, the combination with splint-cutting means, of a bodily-reciprocatory separator comprising two members each provided with fingers which fit into the other member and separate the splints into independent rows, and holding means for the splints.

37. In a match-making machine, the combination with splint-cutting means, of a bodily-reciprocatory separator comprising two members each provided with fingers which fit into the other member and separate the splints into more than two independent rows, a carrier, and plungers for forcing the splints from the separator into the carrier.

38. In a match-making machine, the combination with means for supplying splints, of a separator comprising two bodily-reciprocatory members each provided with fingers which fit into the other member and separate the splints into independent rows, holding means for the splints, and a plunger device for forcing the splints from the separator into the holding means.

39. In a match-making machine, the combination with splint-cutting means, of a bodily-reciprocatory separator comprising separable members, transverse bars fixed to the members and forming backings for the splints received from the cutting device, and holding means for the splints.

40. In a match-making machine, the combination with a splint-cutting device, of a separator comprising two bodily-reciprocatory members, transverse bars fixed to the members and forming backings for the splints received from the cutting device, holding means for the splints, and plungers for forcing the splints from the separator into the holding means.

41. In a match-making machine, the combination with a splint-cutting device, of a bodily-reciprocatory separator comprising two separable members, transverse bars fixed to the members and engaging opposite faces of the splints, holding means for the splints, and means for forcing the splints from the separator into the holding means.

42. In a match-making machine, the combination with means for supplying splints, of a bodily-reciprocatory separator comprising separable members which separate the splints into independent rows, independently-movable splint-engaging devices carried by each of the members of the separator, and holding means for the splints.

43. In a match-making machine, the combination with means for supplying splints, of a bodily-reciprocatory separator comprising separable members which separate the splints into more than two independent rows, independently-movable splint-engaging devices carried by each of the members of the separator, holding means for the splints, together with plungers for forcing the splints from the separator into the holding means.

44. In a match-making machine, the combination with splint-cutting means, of a bodily-reciprocatory separator comprising two separable members which separates the splints into independent rows, sliding plates or fingers movable with and independent of the movable members of the separator for retaining and holding the splints, a carrier, together with plungers for forcing the splints from the separator into the carrier.

45. In a match-making machine, the combination with splint-cutting means, of a bodily-reciprocatory separator comprising separable members having fixed fingers adapted to fit into each other and separate the splints, transverse bars carried by the members of the separator and engaging opposite faces of the splints, splint-engaging devices independently movable of and working in the members of the separator, and holding means for the splints.

46. In a match-making machine, the combination with means for supplying splints, of a bodily-reciprocatory separator comprising separable members having fixed fingers which separate the splints into independent rows, transverse bars carried by and forming a part of the separator members and engaging opposite faces of the splints, splint-engaging devices independently movable of and working in the members of the separator and adapted to retain and hold certain of the splints and to assist in their proper separation, holding means for the splints, together with plungers for forcing the splints from the separator into the holding means.

47. In a match-making machine, the combination with splint-cutting means, of a bodily-reciprocatory separator comprising two separable members each having independent sliding plates or fingers and which separate the splints into independent rows, and holding means for the splints.

48. In a match-making machine, the combination with means for supplying splints, of a bodily-reciprocatory separator comprising two separable members provided with fixed fingers adapted to intermesh and each having independent sliding plates or fingers and adapted to separate the splints into more than two independent rows, and holding means for the splints.

49. In a match-making machine, the combination with means for supplying splints, of a bodily-reciprocatory separator comprising two separable members each having fixed fingers and independent sliding plates and adapted to separate the splints into more than two independent rows, holding means for the splints, and plungers for forcing the splints from the separator into the holding means.

50. In match-making machinery, the combination with rotary cutters, of two bodily-movable members having fingers adapted to intermesh for receiving the splints therefrom and for separating the splints and adapted to convey the same to carrier-frames, means for reciprocating the members, carrier-frames for the splints, plungers for expelling the splints from the members and forcing them into the frames after the members have been moved in one direction, and means for giving a step-by-step movement to the carrier-frames.

51. In match-making machinery, the combination with rotary cutters, a feed-plunger for feeding veneer cards thereto, and means for reciprocating the feed-plunger, of two bodily-movable members having fingers adapted to intermesh for receiving the splints into which the veneer cards are separated by the cutters and for separating the splints and for conveying the same to carrier-frames, means for intermittently reciprocating the members once for every reciprocation of the said feed-plunger, plungers for expelling the splints from the members into carrier-frames, after the members have been moved in one direction, and means for intermittently reciprocating the plungers.

J. A. EKIN CRISWELL.

Witnesses:
WM. R. DAVIS,
JOHN G. PEARSE.